US009497722B2

(12) United States Patent
Husain et al.

(10) Patent No.: US 9,497,722 B2
(45) Date of Patent: Nov. 15, 2016

(54) DISTRIBUTED CO-OPERATING NODES USING TIME REVERSAL

(75) Inventors: Anis Husain, San Diego, CA (US); Jeremy Rode, San Diego, CA (US); David Smith, San Diego, CA (US); Mark Hsu, La Jolla, CA (US); Maha Achour, San Diego, CA (US)

(73) Assignee: ZIVA CORP., San Diego, CA (US)

( * ) Notice: Subject to any disclaimer, the term of this patent is extended or adjusted under 35 U.S.C. 154(b) by 270 days.

(21) Appl. No.: 14/114,901

(22) PCT Filed: May 2, 2012

(86) PCT No.: PCT/US2012/036180
§ 371 (c)(1),
(2), (4) Date: Jan. 24, 2014

(87) PCT Pub. No.: WO2012/151316
PCT Pub. Date: Nov. 8, 2012

(65) Prior Publication Data
US 2014/0126567 A1 May 8, 2014

Related U.S. Application Data

(60) Provisional application No. 61/540,307, filed on Sep. 28, 2011, provisional application No. 61/481,720, filed on May 2, 2011.

(51) Int. Cl.
*H04W 56/00* (2009.01)
*H04W 84/18* (2009.01)
(Continued)

(52) U.S. Cl.
CPC ......... *H04W 56/0025* (2013.01); *H04B 7/024* (2013.01); *H04J 3/0682* (2013.01); *H04J 3/0638* (2013.01); *H04W 56/001* (2013.01); *H04W 84/18* (2013.01)

(58) Field of Classification Search
CPC .... H04B 7/024; H04J 3/0638; H04J 3/0682; H04W 56/001; H04W 56/0025; H04W 84/18
USPC .................. 370/350; 342/103; 375/267, 347
See application file for complete search history.

(56) References Cited

U.S. PATENT DOCUMENTS

| 5,486,833 A * | 1/1996 | Barrett ............... G01S 7/414 342/204 |
| 7,535,409 B1 * | 5/2009 | Choe ................. G01S 7/282 342/159 |

(Continued)

FOREIGN PATENT DOCUMENTS

WO PCT/US2006/060916 5/2007

OTHER PUBLICATIONS

Time-Reversal Detection Using Antenna Arrays; Yuanwei Jin, Senior Member, IEEE, and Jose M. F. Moura, Fellow, IEEE.*
(Continued)

*Primary Examiner* — Andrew Lai
*Assistant Examiner* — Mahmudul Hasan
(74) *Attorney, Agent, or Firm* — Anatoly S. Weiser, Esq.; Techlaw LLP

(57) ABSTRACT

Methods and systems for coherent distributed communication techniques using time reversal are disclosed. In one aspect, cooperating nodes of a cluster can move relative to each other and relative to an intended receiver of the nodes' data transmissions. The nodes are synchronized to a common time reference, and data for transmission from the cluster is distributed to the nodes. The intended receiver sends a sounding signal to the nodes. Each node receives the sounding signal, obtains the channel response between the intended receiver and itself, and time-reverses the channel response. Each node then convolves its time-reversed channel response with the data to obtain the node's convolved data. Each node waits a predetermined time following the time reference signal, as determined based on the common time reference. At the expiration of the predetermined time period, the nodes simultaneously transmit their convolved data.

30 Claims, 4 Drawing Sheets

(51) Int. Cl.
*H04B 7/02* (2006.01)
*H04J 3/06* (2006.01)

(56) References Cited

U.S. PATENT DOCUMENTS

| | | | | |
|---|---|---|---|---|
| 8,195,112 B1* | 6/2012 | Zhang | ............... | H04W 52/225 455/127.2 |
| 2003/0138053 A1* | 7/2003 | Candy | ............... | H04B 7/0615 375/259 |
| 2004/0013211 A1* | 1/2004 | Lindskog | ............ | H04L 1/0618 375/347 |
| 2004/0156443 A1* | 8/2004 | Dent | ............... | H04B 7/0408 375/267 |
| 2006/0098746 A1* | 5/2006 | Candy | ............... | H04L 25/0212 375/259 |
| 2006/0273951 A1* | 12/2006 | Adams | ............. | G01S 7/282 342/159 |
| 2008/0175175 A1* | 7/2008 | Oren | ............... | H04B 1/0064 370/279 |
| 2010/0197264 A1* | 8/2010 | Azadet | ............ | H04L 1/0631 455/272 |
| 2010/0316163 A1* | 12/2010 | Forenza | ............ | H04B 7/024 375/296 |
| 2010/0329187 A1* | 12/2010 | Marsch | ............ | H04L 1/06 370/328 |
| 2011/0002410 A1* | 1/2011 | Forenza | ............ | H04B 7/0617 375/267 |
| 2011/0044193 A1* | 2/2011 | Forenza | ............ | H04B 7/024 370/252 |
| 2011/0286508 A1* | 11/2011 | Smith | ............ | H04L 25/03343 375/224 |
| 2012/0127020 A1* | 5/2012 | Paek | ............ | G01S 13/003 342/103 |
| 2012/0213116 A1* | 8/2012 | Koo | ............ | H04B 1/1027 370/253 |
| 2012/0263056 A1 | 10/2012 | Smith et al. | | |
| 2012/0328037 A1 | 12/2012 | Hsu et al. | | |

OTHER PUBLICATIONS

Jin et al., Time-Reversal Detection Using Antenna Arrays, IEEE Transactions on Signal Processing, 2009, 1396-1404, vol. 57, No. 4, doi: 10.1109/TSP.2008.2010425.

Zmuda et al., Expermental Results for a Photonic Time Reversal Processor for Adaptive Control of an Ultra Wideband Phased Array Antenna, in Hayduk et al. (Eds)., Proc. Spies, Enabling Photonics Technologies for Defense, Security, and Aerospace Applications IV, vol. 6975, 697504 (7 pages), doi: 10.1117/12.783968.

* cited by examiner

DISTRIBUTED CO-OPERATING NODES USING TIME REVERSAL

CROSS-REFERENCE TO RELATED APPLICATIONS

The present application claims priority from (1) U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011; and (2) U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011. Each of these patent documents is hereby incorporated by reference in its entirety as if fully set forth herein, including text, figures, claims, tables, and computer program listing appendices (if present).

FIELD OF THE INVENTION

This document relates generally to radio frequency (RF) communications using time reversal, RF Geolocation/anti-Geolocation using time reversal, and scattering object location and identification.

BACKGROUND

The use of multiple transmit/receive antennas in wireless networks promises mitigation of interference and high spectral efficiencies through concentrating signals along a designated direction or transmission path. Compared to single-antenna-to-single-antenna transmissions, transmit beamforming may yield increased range (e.g., an N-fold increase for free space propagation), increased rate (e.g., an $N^2$-fold increase in a power-limited regime), increased power efficiency (e.g., an N-fold decrease in the net transmitted power for a fixed received power), and/or may allow splitting high data-rate stream into multiple lower data-rate streams. (Here, N is the number of cooperative nodes or antenna elements at the transmit side.)

Distributed coherent transmit beamforming is a form of cooperative communication in which two or more information sources simultaneously transmit a common message, controlling the phase of their transmissions so that the signals constructively combine at an intended destination. Collective digital beamforming implementation in a decentralized network may require distributed algorithms for coordinating the pre-coding matrices used by each element of the arrays of transmit antennas with low overhead. Such distributed transmit beamforming methods often rely on complex weighting algorithms and explicit feedback of the weights from the receiver to the transmitter based on Line-of-Sight (LoS) combination, to shape the collected radiation beam. The implicit transmit beamforming weights may be based on link metrics such as packet error rate and signal-to-noise ratio (SNR), which are not effective in MP environment. By fixing the phase and power radiated by each of the N transmit antennas, up to $N^2$ fold gain can be reached at the receiver. Perfect channel state information (CSI) at the transmitter may be required by conventional transmit beamforming schemes to generate beamforming coefficients and achieve phase alignment at the receiver. In full-feedback closed-loop synchronization, each user uses a single beam and a linear filter at the receiver, while leveraging perfect channel state information (CSI) at the transmitters and receivers. Alternatively, channel training in the forward direction is sent using the current beam-formers and used to adapt the receive filters. Training in the reverse direction is sent using the current receive filters as beams and used to adapt the transmit beamformers. This approach directly estimates the optimal beamformer and receive filter parameters, as opposed to estimating the CSI needed to compute those coefficients. In this approach, neither the transmitters nor the receiver may have perfect channel state information, but there is a low-rate feedback link from the receiver to the transmitters, to adjust nodes' phases for all radios/sensors simultaneously, in each time slot, to achieve phase alignment.

The resultant beam shape at the receiver may resemble a phased-array radiation pattern, with one main lobe and multiple undesired side lobes that cause interference at other nodes. With these techniques, it may be difficult or impossible to support coherent addition of wave-fronts in MP environments, since most distributed beamforming approaches assume LoS links between transmitters and receiver.

Furthermore, the distributed beamforming algorithms may take hundreds of iteration cycles before converging, adding delay and making real-time network adaptation challenging. Also, the iterative algorithms may fail to converge in dynamic channels and other challenging environments.

Thus, selected current distributed communication and networking approaches may suffer from a number of disadvantages, including these:

(1) difficult operation in multipath (MP) and non-line-of-sight (NLoS) environments;

(2) need to rely on complex weights and pre-coding matrices derived from link metrics;

(3) increased interference because of undesired multiple side lobes resulting from beamforming;

(4) additional delay and potential non-converge in dynamic and challenging environments, due to a large number of iterative steps;

(5) reliance on exact channel state information (CSI) at the transmitters;

(6) need for channel training in the forward and return directions to estimate weights and pre-coding matrices; and (7) reliance on exact long term and short term synchronization of carrier, data, and time.

Needs exist for improved communication techniques for distributed coherent communications, and for apparatus and articles of manufacture for such improved communications. Needs also exist for methods, apparatus, and articles of manufacture for hiding transmitter locations in multipath environments in real-time, to prevent hostile receivers from locating signal transmitters, without unduly disrupting communications between the transmitters and their intended receivers. Additional needs exist for improved methods, apparatus, and articles of manufacture that facilitate non-invasive imaging, such as ultrasound imaging.

SUMMARY

Embodiments, variants, and examples described in this document are directed to methods, apparatus, and articles of manufacture that may satisfy one or more of the above described and/or other needs.

In embodiments, distributed cooperating nodes of a cluster can move relative to each other and relative to an intended receiver of the nodes' data transmissions. The nodes are synchronized to a common time reference, and data for transmission from the cluster is distributed to the nodes, using, for example, relatively low power LoS communications between and among the nodes. The intended receiver sends a sounding signal to the nodes. Each node receives the sounding signal, obtains the channel response between the intended receiver and itself, and time-reverses the channel response. Each node then convolves its time-reversed channel response with the data, to obtain the node's convolved data. A master node sends a time reference signal to the other nodes. Each node waits a predetermined time following the time reference signal, as determined based on the common time reference. At the expiration of the predetermined time period, the nodes simultaneously transmit their convolved data. The transmissions from the nodes combine coherently in time-space at the intended receiver.

In an embodiment, a method of transmitting from a plurality of nodes includes synchronizing each node of the plurality of nodes to a common time reference of all nodes of the plurality of nodes, so that all nodes of the plurality of nodes are enabled to transmit synchronously a predetermined synchronization period after a trigger signal is sent from a trigger node of the plurality of nodes; obtaining at said each node of the plurality of nodes information sufficient to transmit from said each node a time-reversed signal corresponding to said each node, so that when all nodes of the plurality of nodes synchronously transmit respective time-reversed signals, the time-reversed signals combine spatially and temporally to focus on a subject; sending the trigger signal from the trigger node of the plurality of nodes; and transmitting the time-reversed signals from all nodes of the plurality of nodes, a time-reversed signal per node, so that a combination of the plurality of time-reversed signals is spatially and temporally focused on the subject, the step of transmitting being performed in response to expiration of the predetermined synchronization period following the step of sending the trigger signal. The nodes of the plurality of nodes are untethered ad hoc nodes movable relative to each other, a different physical clock per node of the plurality of nodes.

In aspects of this embodiment, the step of synchronizing comprises determining at said each node frequency offset of the physical clock of said each node other than a selected node of the plurality of nodes from a physical clock of the selected node. In further aspects, the method includes measuring the predetermined synchronization period at said each node based on the common time reference of all nodes of the plurality of nodes. In further aspects, the method also includes receiving the trigger signal at all nodes of the plurality of nodes other than the trigger node. In further aspects, the common time reference is based on the physical clock of the trigger node.

In still further aspects, the subject is an intended receiver of the time-reversed signals, and every node of the plurality of nodes is within radio frequency (RF) Line-of-Sight (LoS) of one or more other nodes of the plurality of nodes. In still further aspects, the step of obtaining comprises receiving at said each node a sounding signal from the intended receiver; and time-reversing at said each node the sounding signal received at said each node, resulting in said each node obtaining a time-reversed channel response between said each node and the intended receiver.

In aspects of this embodiment, the subject is a first scatterer, the time-reversed signals are intended for an intended receiver, the intended receiver not being the first scatterer, and every node of the plurality of nodes is within radio frequency (RF) Line-of-Sight (LoS) of one or more other nodes of the plurality of nodes. In further aspects, the step of obtaining comprises: receiving at said each node waveforms that resulted from sounding environment using one or more channel sounding bursts transmitted from the intended receiver, the waveforms comprising reflections of the one or more channel sounding bursts from one or more scatterers, the one or more scatterers comprising the first scatterer, and processing the waveforms using time-reversal and Singular Value Decomposition to determine first signatures for launching from all nodes of the plurality of nodes a first transmission temporally and spatially focused on the first scatterer, each first signature corresponding to a different node of the plurality of nodes; and the method further comprises generating the time-reversed signal corresponding to said each node by convolving data intended for the intended receiver with the signature corresponding to said each node. In further aspects, the method further comprises comparing one or more of the first signatures to a plurality of stored signatures, wherein the stored signatures are stored in a database together with identifications of objects corresponding to the stored signatures.

In an embodiment, a method of transmitting from a first node of a plurality of nodes includes synchronizing the first node to a common time reference of the plurality of nodes, so that all nodes of the plurality of nodes are enabled to transmit synchronously a predetermined synchronization period after a trigger signal is sent from a trigger node of the plurality of nodes; obtaining at the first node information sufficient to transmit from the first node a time-reversed signal corresponding to the first node, so that when all nodes of the plurality of nodes synchronously transmit respective time-reversed signals, the time-reversed signals combine spatially and temporally to focus on a subject; receiving the trigger signal at the first node; and transmitting from the first node the time-reversed signal corresponding to the first node in response to expiration of the predetermined synchronization period following the trigger node sending the trigger signal. All nodes of the plurality of nodes are untethered ad hoc nodes movable relative to each other, a different physical clock per node of the plurality of nodes.

In aspects of this embodiment, the step of synchronizing comprises determining at the first node frequency offset of the physical clock of the first node from a physical clock of a selected node of the plurality of nodes. In further aspects of this embodiment, the method includes measuring the predetermined synchronization period at the first node based on the common time reference, the physical clock of the first node being different from the common clock reference. In further aspects, the subject is an intended receiver of the time-reversed signals, and the first node is within radio frequency (RF) Line-of-Sight (LoS) of one or more other nodes of the plurality of nodes. In further aspects, the step of obtaining comprises receiving at the first node a sounding signal from the intended receiver; and time-reversing at the first node the sounding signal received at the first node, resulting in the first node obtaining a time-reversed channel response between the first node and the intended receiver.

In an embodiment, a node comprises an antenna, a transceiver coupled to the antenna, and a processor coupled to the transceiver to control operation of the transceiver. The node is part of a plurality of cooperative nodes. The node is configured to synchronize the node to a common time reference of the plurality of cooperative nodes, so that all nodes of the plurality of cooperative nodes are enabled to transmit synchronously a predetermined synchronization period after a trigger signal is sent from a trigger node of the plurality of cooperative nodes; to obtain at the node information sufficient to transmit from the node a time-reversed signal corresponding to the node, so that when all nodes of the plurality of cooperative nodes synchronously transmit respective time-reversed signals, the time-reversed signals combine spatially and temporally to focus on a subject; to receive the trigger signal at the node; and to transmit from the node the time-reversed signal corresponding to the node in response to expiration of the predetermined synchronization period following the trigger node sending the trigger signal. All nodes of the plurality of cooperative nodes are untethered ad hoc nodes movable relative to each other, a different physical clock per node of the plurality of cooperative nodes.

In aspects, the node is further configured to synchronize to the common time reference by determining at the node frequency offset of the physical clock of the node from a physical clock of a selected node of the plurality of cooperative nodes. In aspects, the node is further configured to measure the predetermined synchronization period at the node based on the common time reference, the physical clock of the node being different from the common clock reference. In aspects, the subject is an intended receiver of the time-reversed signals, and the node is within radio frequency (RF) Line-of-Sight (LoS) of one or more other nodes of the plurality of cooperative nodes. In aspects, the node is configured to obtain the information by receiving a sounding signal from the intended receiver, and time-reversing the sounding signal received at the node, resulting in the node obtaining a time-reversed channel response between the node and the intended receiver.

In an embodiment, a system includes a plurality of nodes, each node of the plurality of nodes comprising an antenna, a transceiver coupled to the antenna, and a processor coupled to the transceiver to control operation of the transceiver. The plurality of nodes is configured to synchronize each node of the plurality of nodes to a common time reference of all nodes of the plurality of nodes, so that all nodes of the plurality of nodes are enabled to transmit synchronously a predetermined synchronization period after a trigger signal is sent from a trigger node of the plurality of nodes; to obtain at said each node of the plurality of nodes information sufficient to transmit from said each node a time-reversed signal corresponding to said each node, so that when all nodes of the plurality of nodes synchronously transmit respective time-reversed signals, the time-reversed signals combine spatially and temporally to focus on a subject; to send the trigger signal from the trigger node of the plurality of nodes; and to transmit the time-reversed signals from all nodes of the plurality of nodes, a time-reversed signal per node, so that a combination of the plurality of time-reversed signals is spatially and temporally focused on the subject, the time-reversed signals being transmitted in response to expiration of the predetermined synchronization period following sending of the trigger signal. The nodes of the plurality of nodes are untethered ad hoc nodes movable relative to each other, a different physical clock per node of the plurality of nodes.

In aspects of this embodiment, the plurality of nodes is further configured to synchronize by determining at said each node frequency offset of the physical clock of said each node, other than a selected node of the plurality of nodes, from a physical clock of the selected node. In aspects, the plurality of nodes is further configured to measure the predetermined synchronization period at said each node based on the common time reference of all nodes of the plurality of nodes. In aspects, the plurality of nodes is further configured to receive the trigger signal at all nodes of the plurality of nodes other than the trigger node. In aspects, the common time reference is based on the physical clock of the trigger node.

In further aspects, the subject is an intended receiver of the time-reversed signals, and every node of the plurality of nodes is within radio frequency (RF) Line-of-Sight (LoS) of one or more other nodes of the plurality of nodes. In further aspects, the plurality of nodes is configured to obtain the information by receiving at said each node a sounding signal from the intended receiver, and time-reversing at said each node the sounding signal received at said each node, resulting in said each node obtaining a time-reversed channel response between said each node and the intended receiver.

In further aspects, the subject is a first scatterer, the time-reversed signals are intended for an intended receiver, the intended receiver not being the first scatterer, and every node of the plurality of nodes is within radio frequency (RF) Line-of-Sight (LoS) of one or more other nodes of the plurality of nodes. In further the plurality of nodes is further configured to obtain the information by (1) receiving at said each node waveforms that resulted from sounding environment using one or more channel sounding bursts transmitted from the intended receiver, the waveforms comprising reflections of the one or more channel sounding bursts from one or more scatterers, the one or more scatterers comprising the first scatterer, and (2) processing the waveforms using time-reversal and Singular Value Decomposition to determine first signatures for launching from all nodes of the plurality of nodes a first transmission temporally and spatially focused on the first scatterer, each first signature corresponding to a different node of the plurality of nodes; and generate the time-reversed signal corresponding to said each node by convolving data intended for the intended receiver with the signature corresponding to said each node. In further aspects, the plurality of nodes is further configured to compare one or more of the first signatures to a plurality of stored signatures, wherein the stored signatures are stored in a database together with identifications of objects corresponding to the stored signatures.

DETAILED DESCRIPTION

Figure 1:
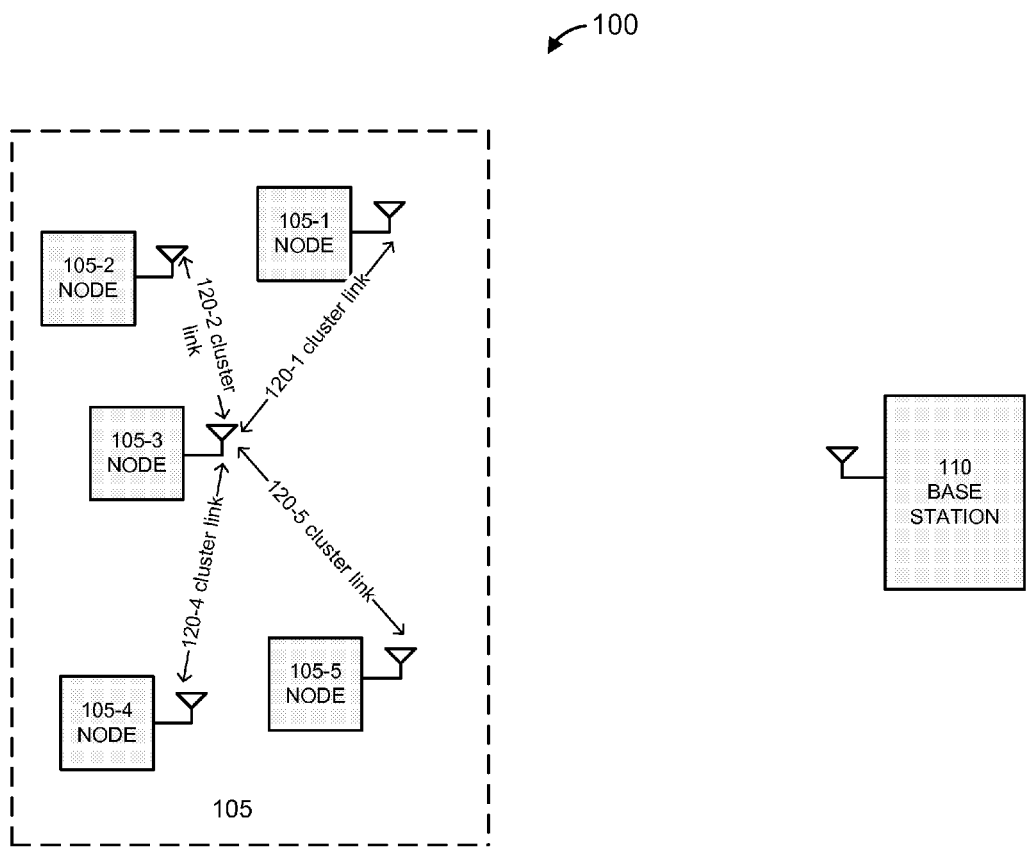
FIG. 1 is a high level block-diagram illustrating selected components of a communication configuration including an intended receiver and distributed cooperating nodes.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning connections through mediate elements.

References to "receiver" ("Rx") and "transmitter" ("Tx") are made in the context of examples of data transmission from the transmitter to the intended receiver. For time reversal communication techniques, the intended receiver may need to transmit to the transmitter a sounding signal, e.g., a pulse/burst or a pilot signal, and the transmitter may need to receive the sounding signal. Moreover, data communications can be bi-directional, with transceivers on both end nodes.

The expression "processing logic" should be understood as selected steps and decision blocks and/or hardware for implementing the selected steps and decision blocks. "Decision block" means a step in which a decision is made based on some condition, and process flow may be altered based on whether the condition is met or not.

Other and further explicit and implicit definitions and clarifications of definitions may be found throughout this document.

Reference will be made in detail to several embodiments that are illustrated in the accompanying drawings. Same reference numerals may be used in the drawings and this description to refer to the same apparatus elements and method steps. The drawings are in a simplified form, not to scale, and omit apparatus elements and method steps that can be added to the described systems and methods, while possibly including certain optional elements and/or steps.

Time Reversal (TR) is a set of communication techniques that uses the reciprocity property of wave equations. Time reversal is described, for example, in U.S. patent application Ser. No. 13/142,236, entitled TECHNIQUES AND SYSTEMS FOR COMMUNICATIONS BASED ON TIME REVERSAL PRE-CODING, filed on 3 Sep. 2010, by David F. Smith and Anis Husain, which application is hereby incorporated by reference in its entirety, as if fully set forth herein, including text, figures, claims, tables, and computer program listing appendix (if present). Briefly, in a system that uses time reversal, a pilot (e.g., a sounding burst) is sent from the target antenna of the Rx to the Tx; the Tx receives the pilot and captures in its analog-to-digital converter (ADC) the Channel Response (CR) of the channel between the Rx antenna and the Tx. The Tx may then be configured to send data back to the Rx by convolving the data with the time-reversed version of the captured CR. Standard modulation techniques can be used to apply the data to the signal by convolving a binary data stream with the time-reversed CR (TR-CR). For example, the Tx may be configured to use the TR-CR as its data pulse/burst. When the TR-CR is launched back down the same channel by the Tx, the actual physical channel that created the multipath now acts as its ideal (or near ideal, as the case may be in the real world) spatial-temporal matched filter and becomes a perfect (or near perfect) equalizer for the signal, creating a pulse at the intended receiver that captures much of the energy present in the original CR. In effect, this can create significant multipath gain. Communication systems employing TR also have the flexibility to operate in 1×N or M×N antenna configurations, with the ability to derive additional gain over and above the MP gain. The systems can focus a signal both spatially and temporally at a designated point in space within the diffraction limits. They can operate with no LoS visibility of the receiver, no knowledge of the location of the receiver, and no array or dish antenna at the transmit end of the link. Additionally, there is no requirement to sweep or scan the Tx array, and the process does not require complex space-time algorithmic processing or calculation, or implementation of a Rake filter to remove the signal distortion created by long MP decay times.

The sounding burst may be a sharp pulse approaching an impulse, a Gaussian pulse, chirp, barker code, Gold code, or another appropriate burst with substantially flat frequency response in the communication band, and having a good autocorrelation function (i.e., approaching that of an impulse function), as is known in communication theory and related fields (e.g., CDMA, autocorrelation radar).

FIG. 1 illustrates in a high level, block-diagram manner, selected components of a communication arrangement 100. This arrangement includes a cluster of ad hoc nodes 105 that communicate with each other. As shown, the cluster 105 includes five distributed cooperating nodes, 105-1 through 105-5. In similar arrangements, the cluster 105 may include any number of a plurality of nodes 105, for example, 2, 3, 4, 5, 6, 7, 8, 9, 10, or more. The arrangement 100 also includes a base station 110. The nodes 105 may represent transceivers of different soldiers of a squad, and the base station 110 may be a transceiver of a command center in a Humvee, tank, or another local headquarters or control center.

The nodes 105 may be within Line-of-Sight (LoS) of each other and can communicate directly with each other via cluster links 120. Although links 120-1, 120-2, 120-4, and 120-5 are shown as connecting the node 105-3 to each of the remaining node 105, this is an exemplary arrangement; more generally, any of the nodes 105 may be connected by such cluster link 120 to any of the other nodes 105. The cluster links 120 may be implemented, for example, using short-range RF link such as a Bluetooth® link, WiFi, or other short-, medium-, and longer-range technologies. The technologies of the cluster links 120 may be standardized or proprietary.

The nodes 105 are ad hoc in the sense that they are free to move and rotate not only relative to the base station 110, but also relative to each other. The distances between any two of the nodes 105 are typically much smaller (by a factor of 10, for example) than the distance between any of the nodes 105 and the base station 110. Additionally, the nodes 105 are not tethered to each other, in the sense that each of the nodes operates using its own physical time reference, and the antennas of the different nodes 1-5 are not electrically connected to each other. Each of the nodes 105 may have a single antenna, or multiple antennas.

Figure 2:
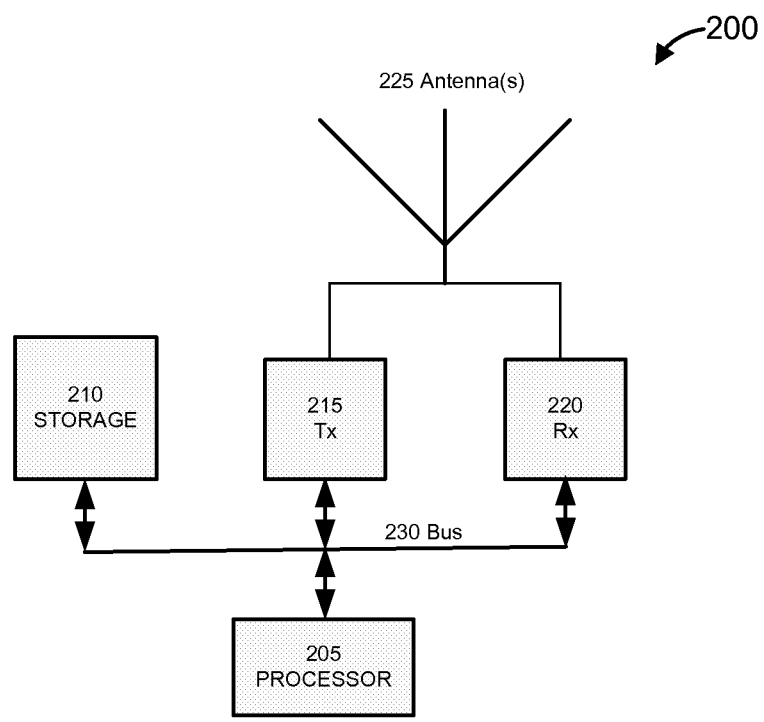
FIG. 2 illustrates selected elements of an apparatus, such as a node or a base station, configured in accordance with one or more features described in this document.

FIG. 2 illustrates selected elements of an apparatus 200 configured in accordance with one or more features described in this document. The apparatus may be any of the cooperative transceivers 105 and/or the base station 110. The apparatus may include a processor 205; a storage device 210 (which may store program code for execution by the processor 205); a receiver 215 configured to receive radio frequency transmissions (including scattered/MP transmissions) from one or more other transceivers/base stations; a transmitter 220 configured to transmit radio frequency transmissions to the other transceivers/base stations; and one or more transmit and receive antennas 225 coupled to the receiver 215 and the transmitter 220. A bus 230 couples the processor 205 to the storage device 210, the receiver 215, and the transmitter 220; and allows the processor 205 to read from and write to these devices, and otherwise to control operation of these devices.

The nodes 105 are configured to communicate coherently (in a synchronized manner) with the base station 110. The communication is "coherent" in the sense that the nodes 105 can transmit the same data to the base station 110 in a synchronized manner so that the radio frequency transmissions (emanations) from all or a plurality of the nodes 105 add coherently in time and space at the receiving antenna(s) of the base station 110.

Figure 3:
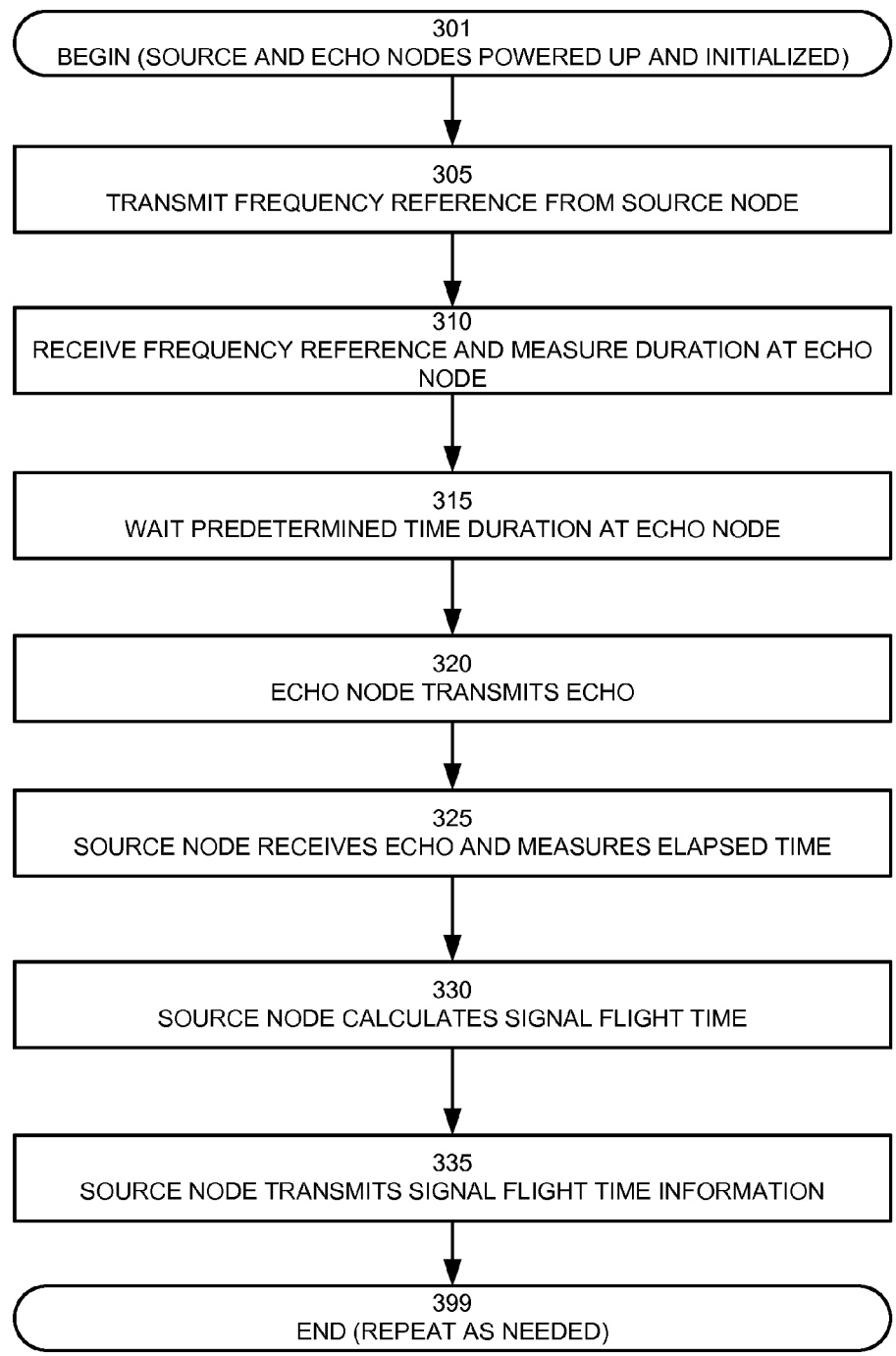
FIG. 3 illustrates selected steps of a process for synchronizing two nodes.

The nodes 105 may be configured to synchronize their internal clock references in various way. In embodiments, the synchronization includes both (1) frequency synchronization, whereby the nodes 105 acquire knowledge of the relative frequency differences of their internal clocks, and (2) knowledge of RF signal time-of-flight between the different nodes 105. FIG. 3 illustrates selected steps of a process 300 for synchronizing a first node (such as one of the nodes 105) and a second node (such as another node 105). In the context of describing the synchronization process, and somewhat arbitrarily, we will refer to the first and second nodes as a source node and an echo node.

At flow point 301, both nodes are powered up, initialized, and ready to communicate with each other.

In step 305, the source node transmits a frequency reference, e.g., a continuous wave pulse of a predetermined duration T at a predetermined frequency F. The frequency F may be the carrier frequency for the communications between the two nodes, and possibly also the carrier frequency for the communications between the cluster 105 and the base station 110. The frequency F is derived from and directly related to the frequency of the internal clock reference of the source node, for example, through a frequency synthesis/PLL circuit. The duration T may be optimized so that it is long enough to average out short term phase noise, but not long enough to include substantial frequency drift. For quartz crystal-controlled F of about 2 GHz, 20-100 ms is a good T duration; in particular embodiments, T was selected to be about 50 ms for quartz crystal-controlled F of 2 GHz.

In step 310, the echo node receives the transmission from the previous step, and measures the duration T as defined by the known number of received pulses of F. Simultaneously, the echo node counts the pulses of the frequency F derived from its own reference. In this way, the echo node acquires knowledge of the relative frequencies of its own clock and the clock of the source node. Consider, for example, the case where F is 2 GHz and T is 50 ms. There should be one hundred million pulses (2,000,000,000×0.050), because the source's determination of T is based on its own clock, and the source's F is also derived from the same clock. Although the echo node's clock may differ somewhat, the number of the received discrete pulses should be counted exactly. But the number of echo node's own clock during the same period may vary, because of the drift of the two clock references. Assuming, for example, that the echo node counted 100,020,000 pulses of the frequency F generated by the echo node the echo node can accurately estimate that its own clock is two hundred parts per million (20,000/100,000,000=200 per million) faster than the source node's reference.

In step 315, the echo node waits a predetermined time duration W after the receipt of the transmission of the previous step. In examples, the echo node determines the duration W by reference to the clock of the source node, rather than its own clock. Continuing with the previous example and further assuming that W is 1 ms, the echo node waits for 2,000,400 pulses of F derived from the echo node's clock. This is so because 1 ms is equivalent to 2,000,000 pulses at the F based on source node's clock, and the clock at the echo node is 200 parts per million (ppm) faster, thus: 2,000,000×1.000200=2,000,400.

In step 320, the echo node transmits its own pulse (echo), which may be a well-defined and short pulse. This step is performed in response to the expiration of the predetermined time duration W.

In step 325, the source node receives the echo and measures E, the time elapsed from the time of transmission in the step 305 until the receipt of the echo.

In step 330, the source node calculates the signal flight time (SFT) between the two nodes. Because E should be equal to W plus twice the signal flight time, the signal flight time may be calculated thus: $E=W+(2\times SFT)=>SFT=(E-W)/2$.

In step 335, the source node may send the SFT information to the echo node.

The process 300 terminates in flow point 399, and may be repeated as needed.

Although the determination of the frequency difference was combined with the determination of SFT, the two determinations can be separated.

The nodes 105 may also be kept in synchronicity by providing each node with a very stable clock reference, such as a cesium or rubidium standard. The clocks may then be re-synchronized at longer intervals. For example, the clocks of the different communications equipment of soldiers of a squad may be synchronized before the beginning of a tactical operation, and the stable references may continue to be synchronized throughout the operation, without re-synchronization. The determination of the relative clock frequencies in the steps 305/310 may then be omitted.

Figure 4:
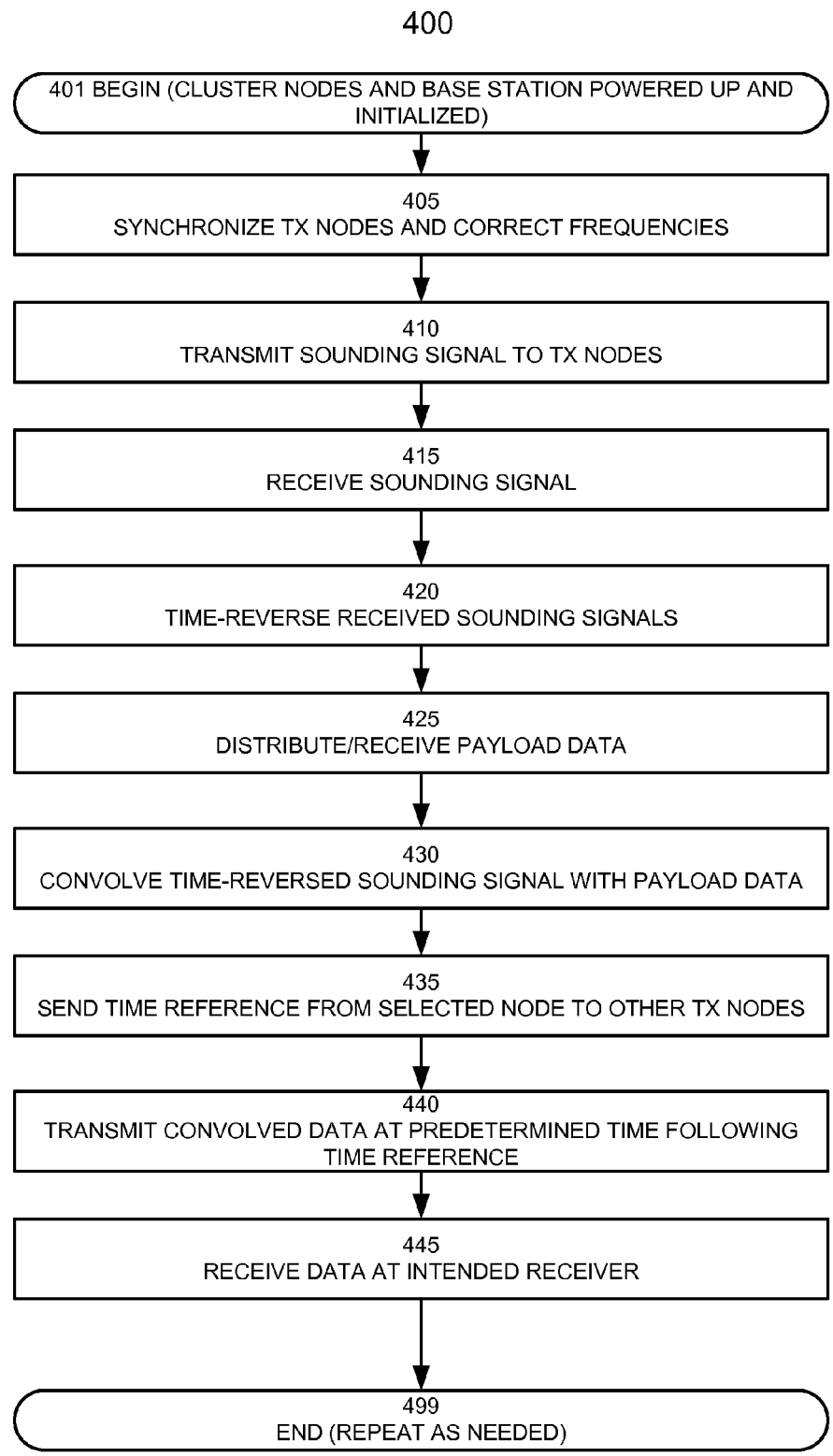
FIG. 4 illustrates selected steps of a process for transmitting data from distributed cooperating nodes to an intended receiver, using time reversal.

Once the nodes 105 are synchronized, they can generate coherent communications. In particular, the nodes 105 can be configured to send coherently data (or other) transmissions to the base station 110. FIG. 4 illustrates selected steps of a process 400 for the nodes 105 to transmit data to the base station 110, using time reversal.

At flow point 401, the plurality of nodes 105 and the base station 110 are powered up, initialized, and ready to communicate.

In step 405, the nodes 105 are synchronized using processes such as the process 300 described above. A single node 105 (a master node) may be used as a source node and the remaining nodes may act as echo nodes; a master node 105 can also act as an echo node for all the other nodes 105 (in which case the steps 335 may become unnecessary). The master node can thus be used to set a common time reference for all the nodes of the cluster. Alternatively, the synchronization may be performed otherwise. In the end, all the nodes 105 are synchronized, and can emit a simultaneous signal.

The most centrally located node within the cluster 105, or one of the more centrally located nodes in the cluster, may be selected as the master node. Centrality of location may be determined by reference to all the nodes of the cluster 105.

In step 410, the base station 110 transmits to the nodes 105 a sounding signal, e.g., a pulse/burst or a pilot signal. The sounding burst may be a sharp pulse approaching an impulse, a Gaussian pulse, chirp, barker code, Gold code, or another appropriate burst with substantially flat frequency response in the communication band, and having a good autocorrelation function (i.e., approaching that of an impulse function), as is known in communication theory and related fields (e.g., CDMA, autocorrelation radar).

In step 415, each of the nodes 105 receives, captures, samples, and stores the received sounding signal. Each of the nodes 105-N will thus store the channel response $CR_N$ between itself and the base station 110. The same master node as was used for synchronization (in the step 405) may instruct each of the nodes 105 to use an identical temporal window to collect the sounding signal from the base station 110. The windows across the cluster 105 may be identical in lengths and may have identical central times. Each node 105 may be told by the master node when to start looking for the sounding pulse, and when to stop. This time frame may be referred to as the "identical window," that is, the time period during which all the transmitters are attempting to receive the sounding pulse. There are other ways to receive the sounding signal at the nodes 105. For example, the receive windows do not necessarily need to be at the same time or be of the same length, but should have a common symmetry point on which to mirror their transmissions.

In step 420, each of the nodes 105 performs time reversal on its stored sounding signal, obtaining and storing its time-reversed channel response $TR-CR_N$. In practice, this step is an approximation of time-reversal, because causality limits the length of each recorded $CR_N$. The $TR-CR_N$ of a particular node 105 is a time-reversed captured window of the particular node 105. The centers of the windows may be aligned across the nodes of the cluster 105.

In step 425, each of the nodes 105 obtains payload data that the cluster 105 intends to transmit to the base station 110. The payload data may be distributed, for example, from one or several of the nodes 105 to the remaining nodes, using the cluster links 120. The payload data may be distributed from the master node. The data may originate at the master node, another node 105, two or more of the nodes 105, or all of the nodes 105.

In step 430, each of the nodes 105 convolves its respective time-reversed channel response $TR-CR_N$ with the payload data, to obtain its respective data for transmission $DT_N$.

In step 435, a selected node 105 sends a reference transmission, such as a short pulse, to the remaining nodes 105. The selected node 105 may be the master node or another node. Several or each of the nodes 105 may be capable of being the master node, and the selection or rotation of the master node role among the nodes 105 capable of being the master node may be predetermined or performed in the field using various algorithms.

In step 440, each of the nodes 105 transmits its respective convolved data $DT_N$. This step is performed by the nodes 105 simultaneously, for example, following a predetermined time duration S after the emission of the reference transmission, as measured at a selected node 105 (e.g., the master node). The length of the predetermined time duration S is preferably longer than the SFT between the selected node 105 (e.g., the master node) and each of the remaining nodes 105. In this way, all of the nodes 105 transmit their respective data $DT_N$ coherently, at the same time. All of the nodes 105 can measure the length of the time period S based on the same time reference; for example, each of the nodes 105 measures S based on the clock of the selected node 105. Recall that the nodes have the information needed to correct their internal time references, because of the synchronization in the step 405. (The frequency offsets are determined as discussed above in relation to the process 300.) The time-reversal process now equalizes both the delays of the multipath signatures and the propagation delay differences, so that all the pulses arrive at the base station 110 at substantially the same times, creating array gain and multipath gain. No intentional alignment or gain is obtained at an unintended (hostile) transceiver, because no matched filtering or alignment generally occurs at any other location but the intended receiver (the base station 110). A multi-node transmit cluster may thus permit significant power reduction and/or range increase in an NLoS multipath channel.

In step 445, the base station 110 (the intended receiver) receives the transmissions from the nodes 105. Because of the properties of time-reversal communications, the received transmissions add coherently in time-space at the base station 110. The properties of time reversal communications cause such coherent focusing, without the need to synchronize the nodes 105 to the base station 110. The time reversal process removes many of the sources of timing errors. The data pulse shape is derived from recording the sounding, so fixed timing delays are removed during the time reversal process.

In effect, the ad hoc distributed nodes 105 act similarly to a single transmitter with multiple spatially diverse antenna elements. Among potential benefits of this technique is the ability to communicate with the base station 110 where a single node 105 may not be powerful enough to close the connection on its own, for example, due to insufficient signal strength, high noise or interference levels, and/or other reasons for poor link reliability.

The process 400 may then terminate at flow point 499, and be repeated as needed.

A node 105 may have two or more antennas, and associated transmitters. Such a node 105 can be treated as multiple virtual nodes 105, according to the number of antennas used in cooperative transmissions to the base station 110. The separate virtual nodes, however, may be synchronized together, and share a single clock reference. For added spatial diversity, the antennas can be implemented using Near-Field Scatterers, as is described in more detail in U.S. patent application Ser. No. 13/440,796, entitled APPARATUS, METHODS, AND ARTICLES OF MANUFACTURE FOR WIRELESS COMMUNICATIONS, filed on 5 Apr. 2012; and in U.S. Provisional Patent Application Ser. No. 61/476,205, entitled TIME REVERSAL COMMUNICATION SYSTEMS WITH NEAR-FIELD SCATTERERS, filed on 15 Apr. 2011. Each of these patent applications is commonly owned with the present patent application, and is hereby incorporated by reference in its entirety as if fully set forth herein, including text, figures, claims, tables, and computer program listing appendices (if present). Briefly, a node 105 may have an antenna array (for the separate virtual nodes) where adjacent antenna array elements are separated by less than the diffraction limit ($\lambda/2$) of the radio frequency communication band in which the apparatus and methods operate. A plurality or multiplicity of near-field scatterers are asymmetrically placed in the immediate vicinity of each of the antenna array elements, to perturb the pattern of each of the antenna elements, making the patterns different even below the diffraction limit. In embodiments, the spacing between the two antenna elements may be less than $\lambda/5$ (wavelength over 5), $\lambda/10$, $\lambda/15$, $\lambda/30$ intervals, or even less, for all wavelengths (or the longest wavelength, or the center wavelength) of the design band of the communication system. The polarization of the near-field scatterers may be the same as or substantially the same as the polarization of the elements of the antenna array, so that the scatterers interact efficiently (in the electromagnetic sense) with the antenna elements of the array. The spacing of at least some (one or more) of the near-field scatterers from one or more of the antenna elements of the array may be less than the spacing between the adjacent antenna elements of the array. The spacing of at least some of the scatterers from one or more antenna elements of the array may be less than $0.2\lambda$, less than $0.15\lambda$, less than $0.1\lambda$, less than $0.05\lambda$, less than $0.03\lambda$, or less than $0.01\lambda$.

The method 400 may further include one or more steps for selecting the nodes for inclusion in the cluster 105, from among the nodes available for clustering. In performing such selection, the nodes with signal-to-noise ratio (SNR) or signal-to-noise and interference ratio (SNIR) falling below a predetermined limit may be omitted and not included in the cluster 105. The selection may be performed dynamically, because the nodes may move and the environment may change in real time. Furthermore, the time-reversed channel responses $TR\text{-}CR_N$ of the nodes 105 may be analyzed for "disjointedness," i.e., excessive delays in the channels between the base station 110 and some of the nodes 105. The channels with delays over a predetermined limit can be eliminated from the cluster 105, equalizing the (dominant) delays across the cluster. Furthermore, one or more additional clusters may be formed from such nodes. If, for example, there are nodes on either side of a building, it might be better to split them into one cluster on one side of the building, and a second cluster on the other side of the building.

U.S. patent application Ser. No. 13/462,514, entitled Anti-Geolocation, filed on 2 May 2012, is commonly owned with the present application. The Anti-Geolocation application describes methods for preventing or making more difficult Geolocation of a source transmitter having an array of antennas. The Anti-Geolocation application is hereby incorporated by reference in its entirety as if fully set forth herein, including text, figures, claims, tables, and computer program listing appendices (if present). The Geolocation methods described there can be practiced with the cluster 105, synchronized as described above. See the description of the process 300 above. In particular, each of the nodes 105 can act as an antenna element, and the nodes 105 can be configured to use time reversal to illuminate an external scatterer instead of the intended receiver (such as the base station 105), in effect creating a virtual transmitter from the illuminated scatterer. The nodes 105 can be configured to illuminate sequentially a plurality of scatterers, creating an appearance of a walking transmitter. The cluster may create a scatter matrix, and apply Singular Value Decomposition (SVD) to the matrix to obtain eigenvalues, and eigenvectors/eigenfunctions of the matrix, which correspond to signatures of different scatterers. Illuminating a particular scatterer may cause a hostile transceiver to become confused as to the location of the actual nodes 105 and/or their number. Additionally, collective focusing of multiple nodes 105 may be used to focus simultaneously on multiple scatterers, simultaneously creating multiple virtual sources, for an extra layer of misdirection.

Creating virtual transmitters by focusing on scatterers in the operating environment may also be useful for locating concealed objects and determining their properties. Thus, a strong scatterer identified on an apparent civilian person by a squad of soldiers may indicate a weapon concealed under the clothing of the person. Furthermore, illumination by a spatially diverse cluster, from different angles, allows a better look at the concealed object. The signature of the concealed object thus obtained may be compared to signatures in a library storing many signatures of various more or less common objects. When a match of predetermined degree (or greater) between the analyzed signature and a stored signature is present, an indication can be provided, for example, a visual and/or audio warning as to the possible nature of the object.

Above, we have focused on radio frequency operations. The same principles may apply to ultrasound, for example, in a medical context. Applying the techniques described above, including those in the Anti-Geolocation application, allows better scanning. For instance, today's brain scanning relies on implanting a transmitter inside the skull. Using multiple ultrasound sources along with time reversal and SVD, multiple virtual sources may be created inside the skull to image the brain. Near-Field scatterers can also be used to increase the density of ultrasound sources and increase TR gain to enable signal penetration through the skull.

Synchronization of the nodes 105 may also be advantageous for implementing a low probability of intercept (LPI) communication mode. Since time reversal sends a "messy" signal with significant inter-symbol interference (ISI), an observer at a location other than the intended receiver may find it difficult to deconvolve the data. It is possible, however, to add additional security to a cooperative cluster through distributed coding. For example, a common source node (e.g., the base station 110) generates a data stream, applies Forward Error Correction (FEC) coding to the stream, and then demultiplexes the stream by attaching each successive bit to a different TR-CRi on each transmit antenna. The different streams are then summed and transmitted using time reversal. Each successive bit will arrive at the correct receiver, but no one data stream will have the correct bits to decode the FEC correctly since the FEC code is spread across all the channels at the same frequency. If one attempts to decode a single stream, $(N-1)/N\times100\%$ of the FEC data is missing, making it impossible to know how to decode the sequence. However, in the designated TR channel, if time synchronization of the receivers (e.g., the nodes 105) is pre-established, each receiver will automatically recover the correct data sequence at the correct receiver, and these can now be cooperatively combined to re-establish the original FEC coded sequence, which can now be decoded. If this total channel is operated at a very poor bit error rate (BER), requiring strong FEC, then the sequence can only be recovered error free if it is first completely regenerated at the physical layer by the TR process. This sequence can now be successfully decoded. However, it is impossible for a hostile observer to perform the time reversal, because the hostile observer has no way to recover the transmitted data sequence and decode the FEC, particularly if the cooperative receivers (105) are placed at such a distance from each other that makes it impossible for the hostile observer to be physically close to more than one of them simultaneously. Not only will the hostile observer not be able to physically reconstruct the signal, but even if the hostile observer could somehow isolate all the different sequences heading to each receive node, the hostile observer is at a different location than the correct receiver node (105) and so has no way to know what order or delays to use to align the streams.

Another layer of security is added if the sub-lambda antennas (with near-field scatterers) are used, because then the hostile observer cannot resolve the separate transmissions from each antenna and attempt to deconstruct the signals.

This can be applied to at least two cases. The first one is accomplished by using one or multiple Tx radios supporting high data rates and desiring to communicate with multiple receivers operating with much lower data rates. The second one is accomplished by using one or multiple Rx radios supporting high data rates desiring to communicate with multiple transmitters operating with much lower data rates.

In both cases, the clustering of Tx and Rx radios based on their capabilities, locations, and MP signatures is achieved at the network level followed by splitting the high-data signals to multiple lower data rate signals in a time division multiplexed (TDM) fashion. Each of the lower data streams is transmitted to or received by the designated radio. Then, the high-data rate signal is reconstructed at the network layer.

The features described throughout this document may be present individually, or in any combination or permutation, except where presence or absence of specific elements/limitations is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for communications and other techniques using distributed cooperating nodes. This was done for illustration purposes only and, therefore, the foregoing description is not necessarily intended to limit the spirit and scope of the invention(s) described. Neither the specific embodiments of the invention(s) as a whole, nor those of their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of transmitting from a plurality of nodes, the method comprising steps of:
    synchronizing each node of the plurality of nodes to a common time reference of all nodes of the plurality of nodes, so that all nodes of the plurality of nodes are enabled to transmit synchronously following a predetermined synchronization period after a trigger signal is sent from a trigger node of the plurality of nodes;
    obtaining at said each node of the plurality of nodes information sufficient to transmit from said each node a time-reversed signal corresponding to said each node, the time-reversed signal corresponding to said each node being such that when all nodes of the plurality of nodes synchronously transmit respective time-reversed signals, the time-reversed signals transmitted by all nodes of the plurality of nodes combine spatially and temporally to focus on a subject, the step of obtaining comprising steps of receiving at said each node one or more waveforms resulting from a sounding signal, and time-reversing at said each node the one or more waveforms resulting from the sounding signal;
    sending the trigger signal from the trigger node of the plurality of nodes; and
    transmitting the time-reversed signals from all nodes of the plurality of nodes, one of the time-reversed signals per corresponding node, so that a combination of the plurality of time-reversed signals is spatially and temporally focused on the subject, the step of transmitting being performed in response to expiration of the predetermined synchronization period following the step of sending the trigger signal;
    wherein the nodes of the plurality of nodes art untethered ad hoc nodes movable relative to each other, and each node of the plurality of nodes has a different physical clock.

2. The method according to claim 1, wherein the step of synchronizing comprises:
    determining at said each node of the plurality of nodes, other than a selected node, frequency offset of a physical clock of said each node of the plurality of nodes other than the selected node from a physical clock of the selected node, and
    determining signal flight times between at least some nodes of the plurality of nodes.

3. The method according to claim 2, further comprising measuring the predetermined synchronization period at said each node based on the common time reference of all nodes of the plurality of nodes.

4. The method according to claim 3, further comprising receiving the trigger signal at all nodes of the plurality of nodes other than the trigger node.

5. The method according to claim 4, wherein the common time reference is based on the physical clock of the trigger node.

6. The method according to claim 5, wherein the subject is an intended receiver of the time-reversed signals, and every node of the plurality of nodes is within radio frequency (RF) Line-of-Sight (LoS) of one or more other nodes of the plurality of nodes.

7. The method according to claim 6, wherein the sounding signal is emitted by the intended receiver;
- all nodes of the plurality of nodes receive the one or more waveforms resulting from the sounding signal in an identical temporal window; and
- time-reversing at said each node the one or more waveforms received at said each node results in said each node obtaining a time-reversed channel response between said each node and the intended receiver.

8. The method according to claim 5, wherein the subject is a first scatterer, the time-reversed signals are intended for an intended receiver, the intended receiver not being the first scatterer, and every node of the plurality of nodes is within radio frequency (RF) Line-of-Sight (LoS) of one or more other nodes of the plurality of nodes.

9. The method according to claim 8, wherein:
- the sounding signal comprises one or more channel sounding bursts transmitted from the intended receiver, the one or more waveforms comprising reflections of the one or more channel sounding bursts from one or more scatterers, the one or more scatterers comprising the first scatterer, and
- the step of obtaining further comprises processing the one or more waveforms using Singular Value Decomposition to determine first signatures for launching from all nodes of the plurality of nodes a first transmission temporally and spatially focused on the first scatterer, each first signature corresponding to a different node of the plurality of nodes;
- the method further comprising:
  - generating the time-reversed signal corresponding to said each node by convolving data intended for the intended receiver with the signature corresponding to said each node.

10. The method according to claim 9, further comprising comparing one or more of the first signatures to a plurality of stored signatures, wherein the stored signatures are stored in a database together with identifications of objects corresponding to the stored signatures.

11. A method of transmitting from a first node of a plurality of nodes, the method comprising steps of:
- synchronizing the first node to a common time reference of the plurality of nodes, so that all nodes of the plurality of nodes are enabled to transmit synchronously following a predetermined synchronization period after a trigger signal is sent from a trigger node of the plurality of nodes;
- obtaining at the first node information sufficient to transmit from the first node a time-reversed signal corresponding to the first node such that when all nodes of the plurality of nodes synchronously transmit respective time-reversed signals, the time-reversed signals transmitted by all nodes of the plurality of nodes combine spatially and temporally to focus on an intended receiver, the step of obtaining comprising steps of receiving at the first node one or more waveforms caused by a sounding signal emitted by the intended receiver, and time-reversing at the first node the one or more waveforms received at the first node, resulting in the first node obtaining a time-reversed channel response between the first node and the subject;
- receiving the trigger signal at the first node; and
- transmitting from the first node the time-reversed signal corresponding to the first node in response to expiration of the predetermined synchronization period following the trigger node sending the trigger signal;
- wherein all nodes of the plurality of nodes are untethered ad hoc nodes movable relative to each other, and each node of the plurality of nodes has a different physical clock.

12. The method according to claim 11, wherein the step of synchronizing comprises determining at the first node (1) frequency offset of the physical clock of the first node from a physical clock of a selected node of the plurality of nodes, and (2) signal flight time between the first node and the selected node.

13. The method according to claim 12, further comprising measuring the predetermined synchronization period at the first node based on the common time reference, the physical clock of the first node being different from the common clock reference.

14. The method according to claim 13, wherein the first node is within radio frequency (RF) Line-of-Sight (LoS) of one or more other nodes of the plurality of nodes.

15. A node comprising an antenna, a transceiver coupled to the antenna, and a processor coupled to the transceiver to control operation of the transceiver, wherein the node is part of a plurality of cooperative nodes, the node being configured to:
- synchronize the node to a common time reference of the plurality of cooperative nodes, so that all nodes of the plurality of cooperative nodes are enabled to transmit synchronously following a predetermined synchronization period after a trigger signal is sent from a trigger node of the plurality of cooperative nodes;
- obtain at the node information sufficient to transmit from the node a time-reversed signal corresponding to the node, the time-reversed signal corresponding to the node being such that when all nodes of the plurality of cooperative nodes synchronously transmit respective time-reversed signals, the time-reversed signals transmitted by all nodes of the plurality of cooperative nodes combine spatially and temporally to focus on an intended receiver of the time-reversed signals, wherein the node is configured to obtain the information by receiving a sounding signal from the intended receiver, and time-reversing the sounding signal received at the node, resulting in the node obtaining a time-reversed channel response between the node and the intended receiver;
- receive the trigger signal at the node; and
- transmit from the node the time-reversed signal corresponding to the node in response to expiration of the predetermined synchronization period following the trigger node sending the trigger signal;
- wherein all nodes of the plurality of cooperative nodes are untethered ad hoc nodes movable relative to each other, and each node of the plurality of cooperative nodes has a different physical clock.

16. The node according to claim 15, wherein the node is further configured to synchronize to the common time reference by:
- determining at the node frequency offset of the physical clock of the node from a physical clock of a selected node of the plurality of cooperative nodes, and
- determining signal flight time between the node and the selected node.

17. The node according to claim 16, wherein the node is further configured to measure the predetermined synchronization period at the node based on the common time reference, the physical clock of the node being different from the common clock reference.

18. The node according to claim 17, wherein the node is within radio frequency (RF) Line-of-Sight (LoS) of one or more other nodes of the plurality of cooperative nodes.

19. The node according to claim 18, wherein the plurality of nodes comprises at least three nodes.

20. A system comprising a plurality of nodes, each node of the plurality of nodes comprising an antenna, a transceiver coupled to the antenna, and a processor coupled to the transceiver to control operation of the transceiver, wherein the plurality of nodes is configured to:
  synchronize each node of the plurality of nodes to a common time reference of all nodes of the plurality of nodes, so that all nodes of the plurality of nodes are enabled to transmit synchronously following a predetermined synchronization period after a trigger signal is sent from a trigger node of the plurality of nodes;
  obtain at said each node of the plurality of nodes information sufficient to transmit from said each node a time-reversed signal corresponding to said each node, the time-reversed signal corresponding to said each node being such that when all nodes of the plurality of nodes synchronously transmit respective time-reversed signals, the time-reversed signals transmitted by all nodes of the plurality of nodes combine spatially and temporally to focus on a subject, wherein the plurality of nodes is configured to obtain the information by receiving at said each node one or more waveforms caused by a sounding signal, and time-reversing at said each node the one or more waveforms received at said each node to result in said each node obtaining a time-reversed channel response between said each node and the subject;
  send the trigger signal from the trigger node of the plurality of nodes; and
  transmit the time-reversed signals from all nodes of the plurality of nodes, a time-reversed signal per corresponding node, so that a combination of the plurality of time-reversed signals is spatially and temporally focused on the subject, the time-reversed signals being transmitted in response to expiration of the predetermined synchronization period following sending of the trigger signal;
  wherein the nodes of the plurality of nodes are untethered ad hoc nodes movable relative to each other, and each node of the plurality of nodes has a different physical clock.

21. A system according to claim 20, wherein the plurality of nodes is further configured to synchronize by
  determining at said each node of the plurality of nodes, other than a selected node of the plurality of nodes, frequency offset of a physical clock of said each node of the plurality of nodes, other than the selected node, from a physical clock of the selected node; and
  determining signal flight times between the selected node and at least one other node of the plurality of nodes; and
  wherein the plurality of nodes comprises at least three nodes.

22. A system according to claim 21, wherein the plurality of nodes is further configured to measure the predetermined synchronization period at said each node based on the common time reference of all nodes of the plurality of nodes.

23. A system according to claim 22, wherein the plurality of nodes is further configured to receive the trigger signal at all nodes of the plurality of nodes other than the trigger node.

24. A system according to claim 23, wherein the common time reference is based on the physical clock of the trigger node.

25. A system according to claim 24, wherein the subject is an intended receiver of the time-reversed signals transmitted from all nodes of the plurality of nodes, and every node of the plurality of nodes is within radio frequency (RF) Line-of-Sight (LoS) of one or more other nodes of the plurality of nodes.

26. A system according to claim 25, wherein all nodes of the plurality of nodes receive the sounding signal in an identical temporal window.

27. A system according to claim 24, wherein the subject is a first scatterer, the time-reversed signals transmitted from all nodes of the plurality of nodes are intended for an intended receiver, the intended receiver not being the first scatterer, and every node of the plurality of nodes is within radio frequency (RF) Line-of-Sight (LoS) of one or more other nodes of the plurality of nodes.

28. A system according to claim 27, wherein
  the sounding signal comprises one or more channel sounding bursts transmitted from the intended receiver, the one or more waveforms received at said each node comprising reflections of the one or more channel sounding bursts from one or more scatterers, the one or more scatterers comprising the first scatterer;
  the plurality of nodes is further configured to process the one or more waveforms using Singular Value Decomposition to determine first signatures for launching from all nodes of the plurality of nodes a first transmission temporally and spatially focused on the first scatterer, each first signature corresponding to a different node of the plurality of nodes; and
  the plurality of nodes is further configured to generate the time-reversed signal corresponding to said each node by convolving data intended for the intended receiver with the signature corresponding to said each node.

29. A system according to claim 28, wherein the plurality of nodes is further configured to compare one or more of the first signatures to a plurality of stored signatures, wherein the stored signatures are stored in a database together with identifications of objects corresponding to the stored signatures.

30. A method of transmitting from a plurality of nodes, the method comprising steps of:
  step for synchronizing each node of the plurality of nodes to a common time reference of all nodes of the plurality of nodes, so that all nodes of the plurality of nodes are enabled to transmit synchronously following a predetermined synchronization period after a trigger signal is sent from a trigger node of the plurality of nodes;
  step for obtaining at said each node of the plurality of nodes information sufficient to transmit from said each node a time-reversed signal corresponding to said each node, the time-reversed signal corresponding to said each node being such that when all nodes of the plurality of nodes synchronously transmit respective time-reversed signals, the time-reversed signals transmitted by all nodes of the plurality of nodes combine spatially and temporally to focus on a subject;
  sending the trigger signal from the trigger node of the plurality of nodes; and
  step for transmitting the time-reversed signals from all nodes of the plurality of nodes, a one of the time-reversed signals per corresponding node, so that a combination of the plurality of time-reversed signals transmitted from all nodes of the plurality of nodes is spatially and temporally focused on the subject, the step of transmitting being performed in response to expiration of the predetermined synchronization period following the step of sending the trigger signal;

wherein the nodes of the plurality of nodes are untethered ad hoc nodes movable relative to each other, and each node of the plurality of nodes has a different physical clock.

\* \* \* \* \*

UNITED STATES PATENT AND TRADEMARK OFFICE
CERTIFICATE OF CORRECTION

PATENT NO. : 9,497,722 B2  
APPLICATION NO. : 14/114901  
DATED : November 15, 2016  
INVENTOR(S) : Husain et al.

It is certified that error appears in the above-identified patent and that said Letters Patent is hereby corrected as shown below:

In the Claims

Column 16, Line 40, cancel "art" and replace the cancelled text with --are--;

Column 20, Line 64, cancel "nodes, a one" and replace the cancelled text with --nodes, one--.

Signed and Sealed this
Third Day of January, 2017

Michelle K. Lee
*Director of the United States Patent and Trademark Office*